INVENTOR:
PETER G. IVANCHICH
BY
ATTORNEYS.

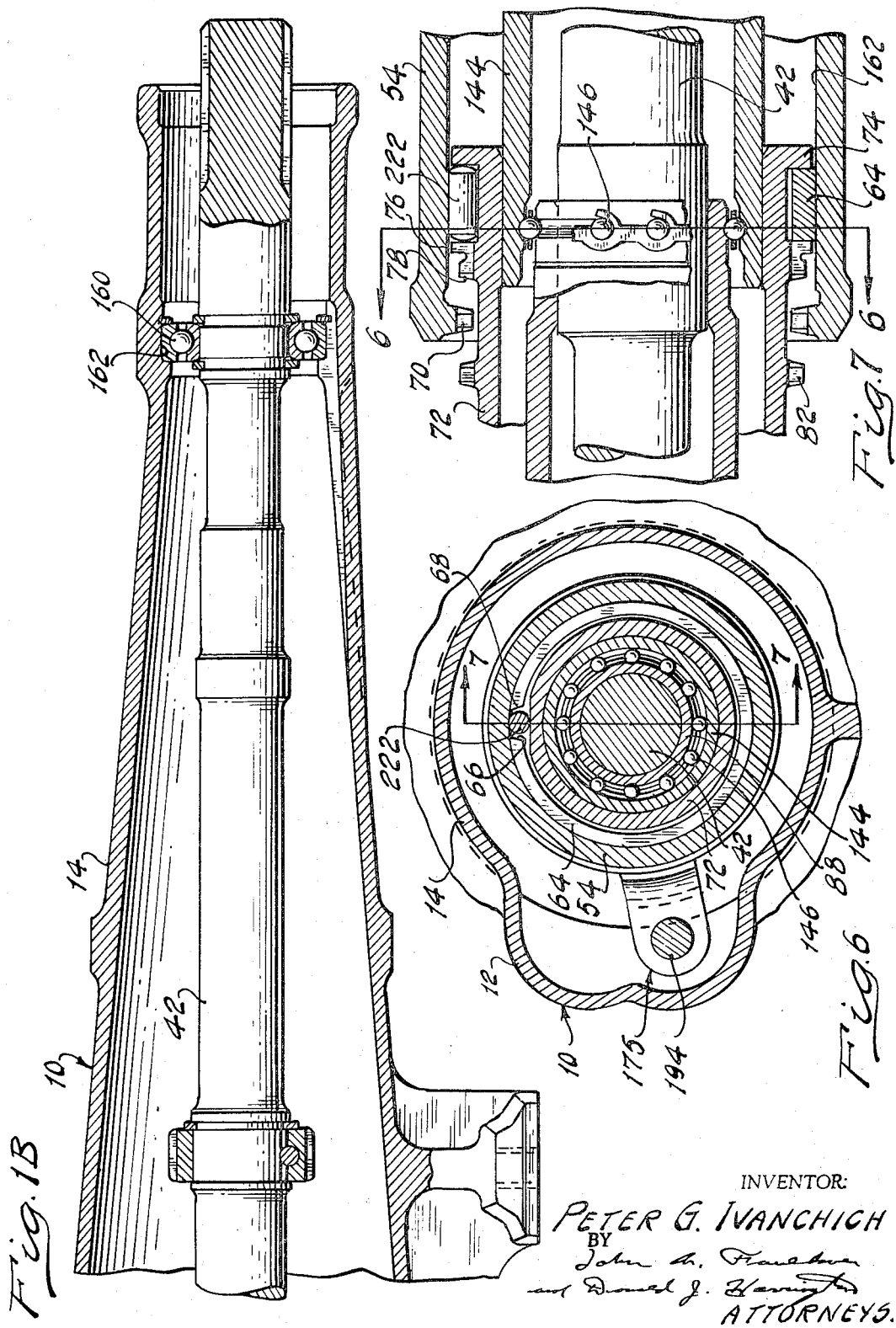

Nov. 28, 1967     P. G. IVANCHICH     3,354,738
MULTIPLE SPEED RATIO POWER TRANSMISSION MECHANISM
Filed June 9, 1965     9 Sheets-Sheet 3
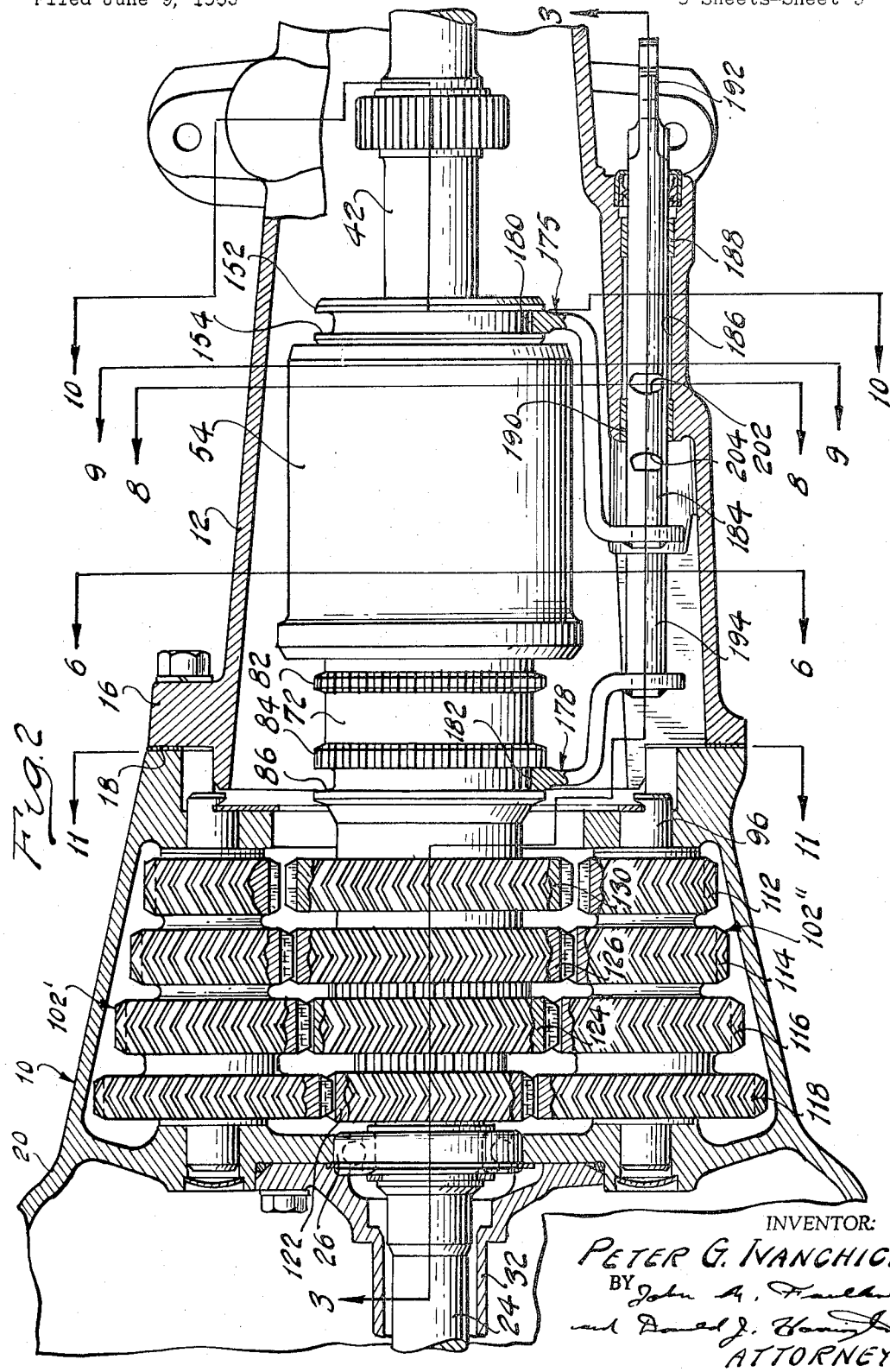
INVENTOR:
PETER G. IVANCHICH
BY
ATTORNEYS.

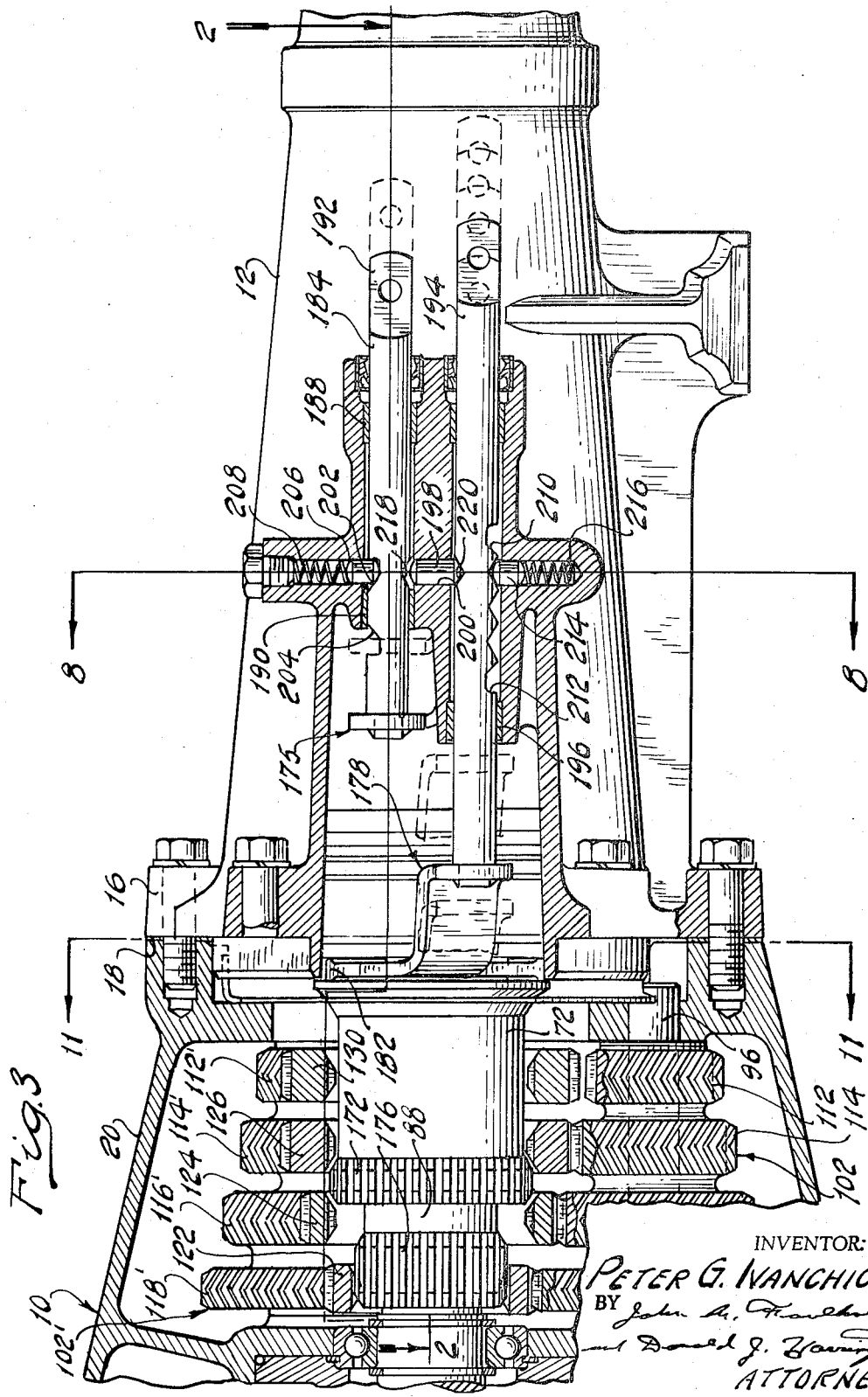

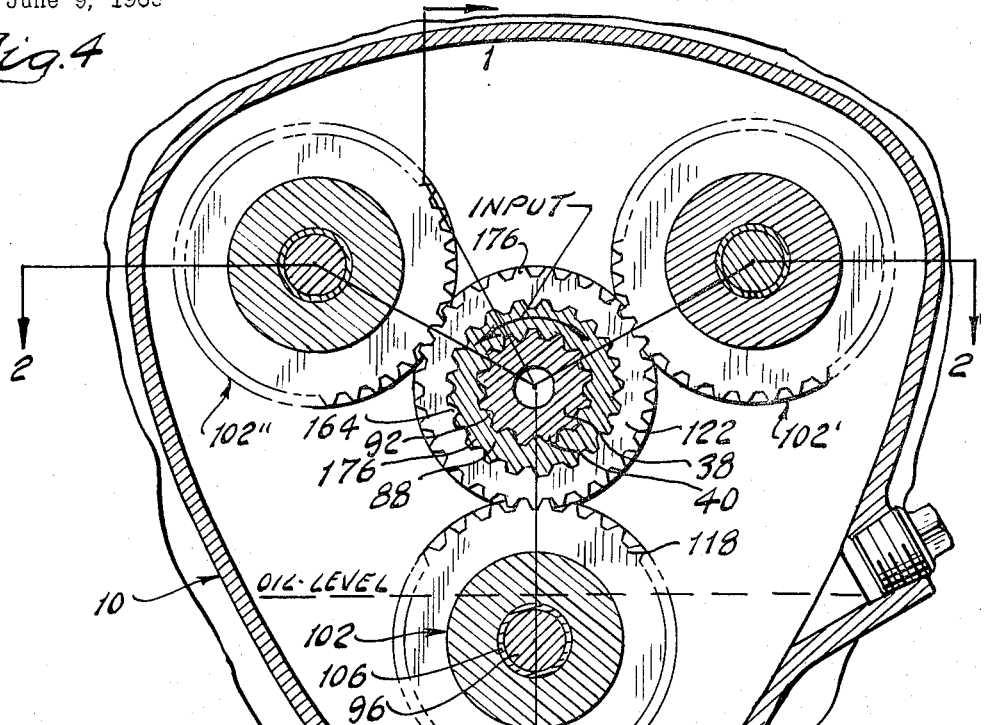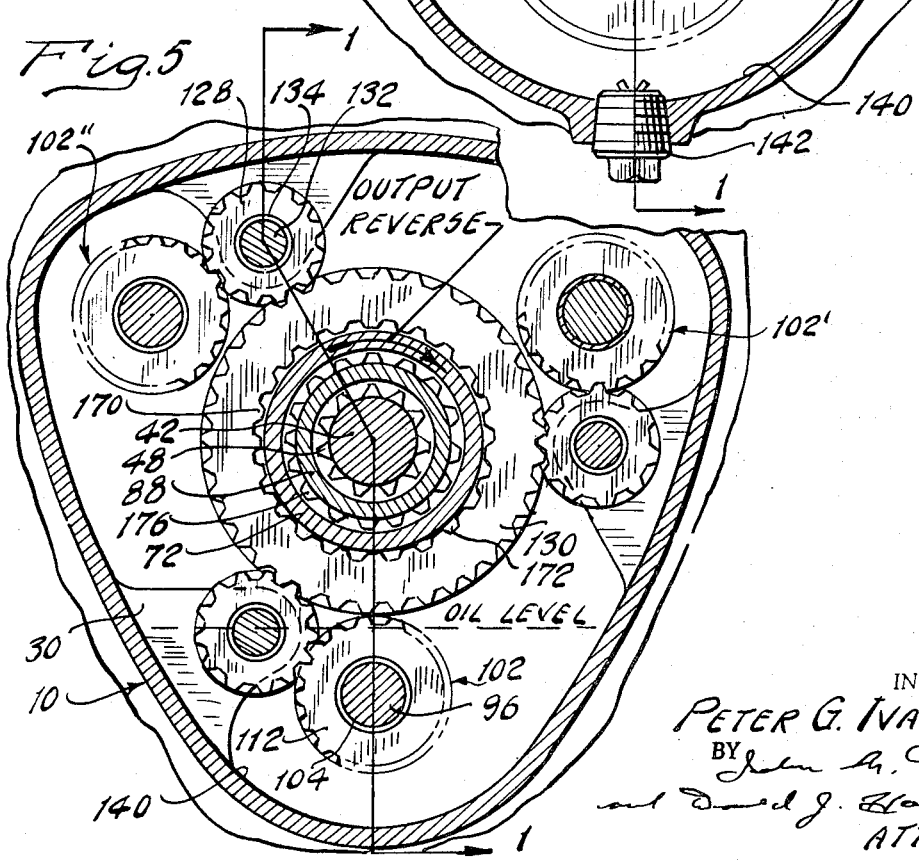

Nov. 28, 1967     P. G. IVANCHICH     3,354,738
MULTIPLE SPEED RATIO POWER TRANSMISSION MECHANISM
Filed June 9, 1965     9 Sheets-Sheet 6
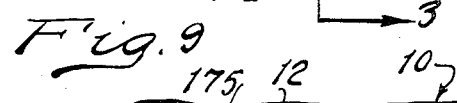
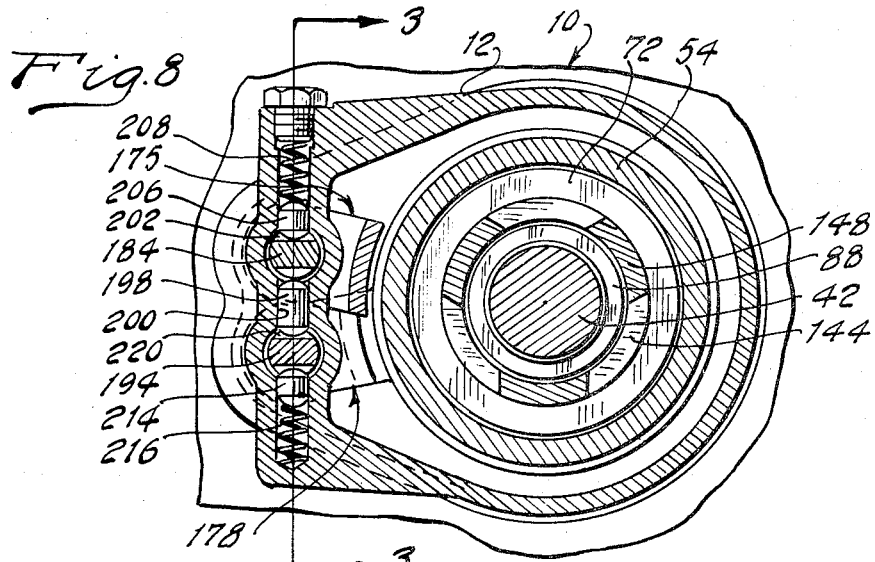
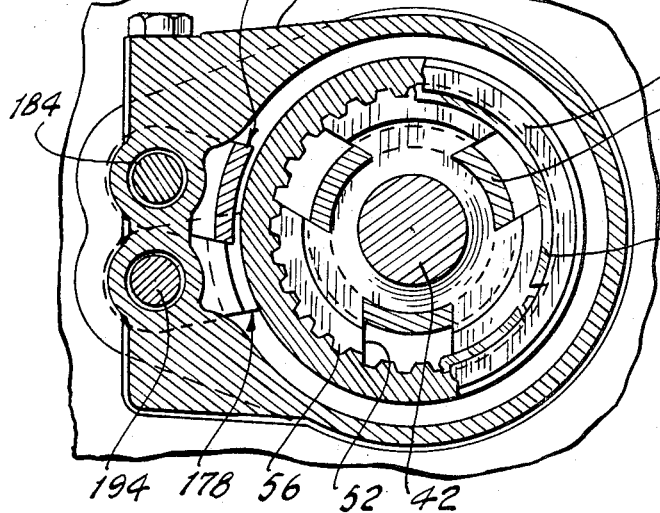
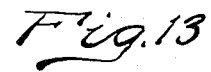
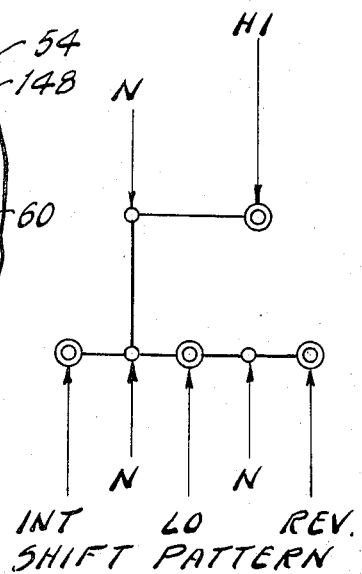
INVENTOR:
PETER G. IVANCHICH
BY
ATTORNEYS.

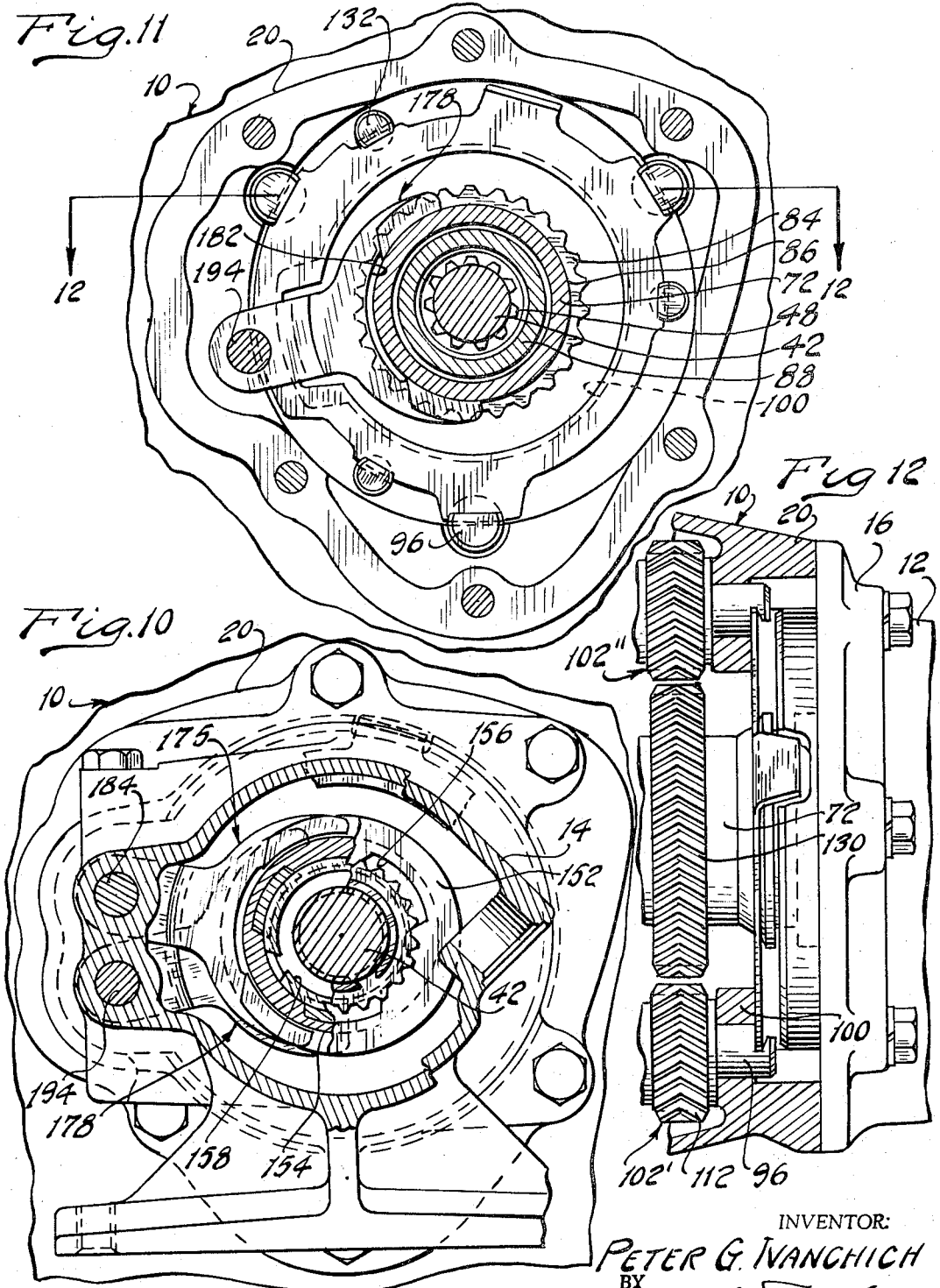

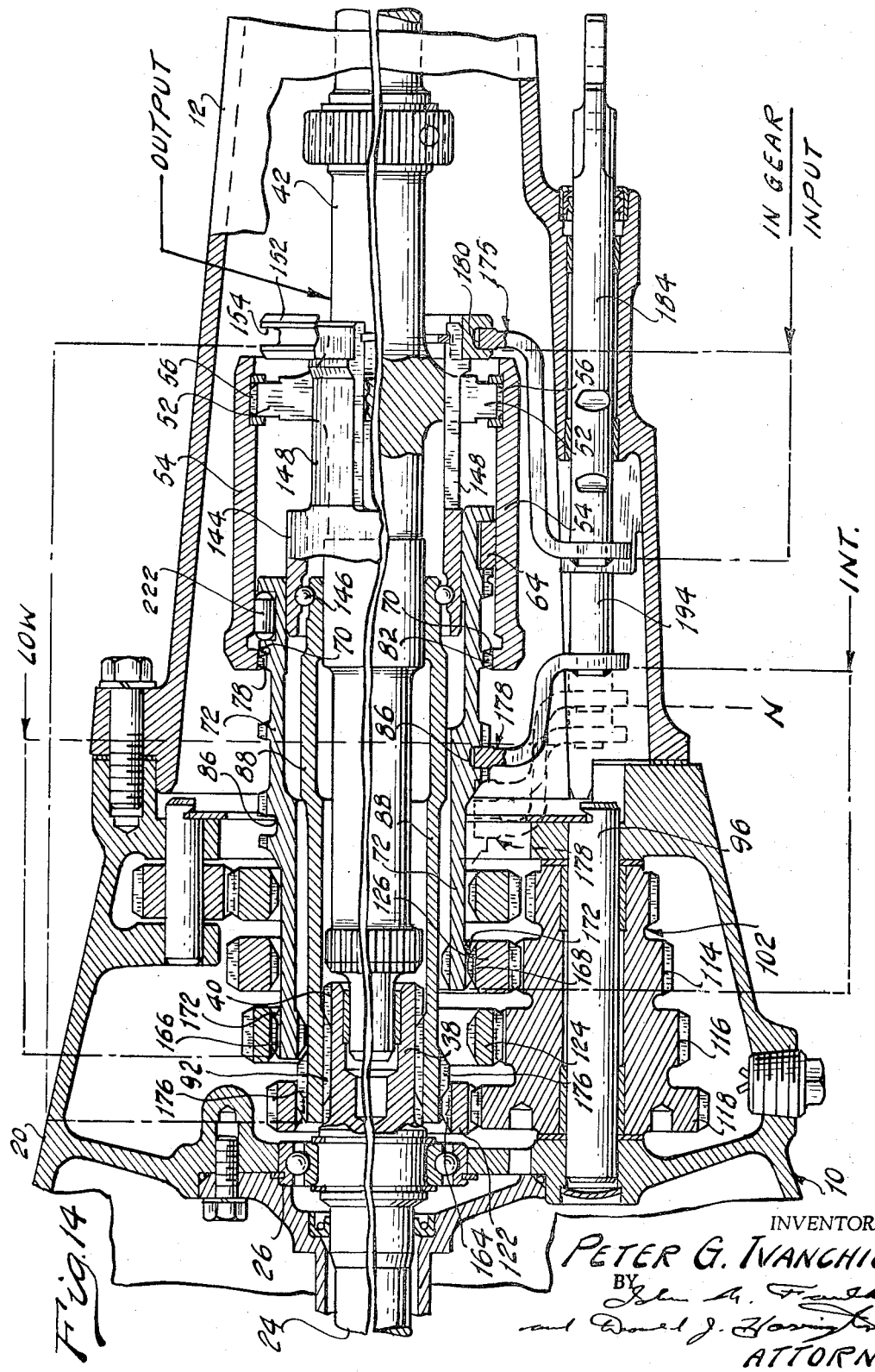

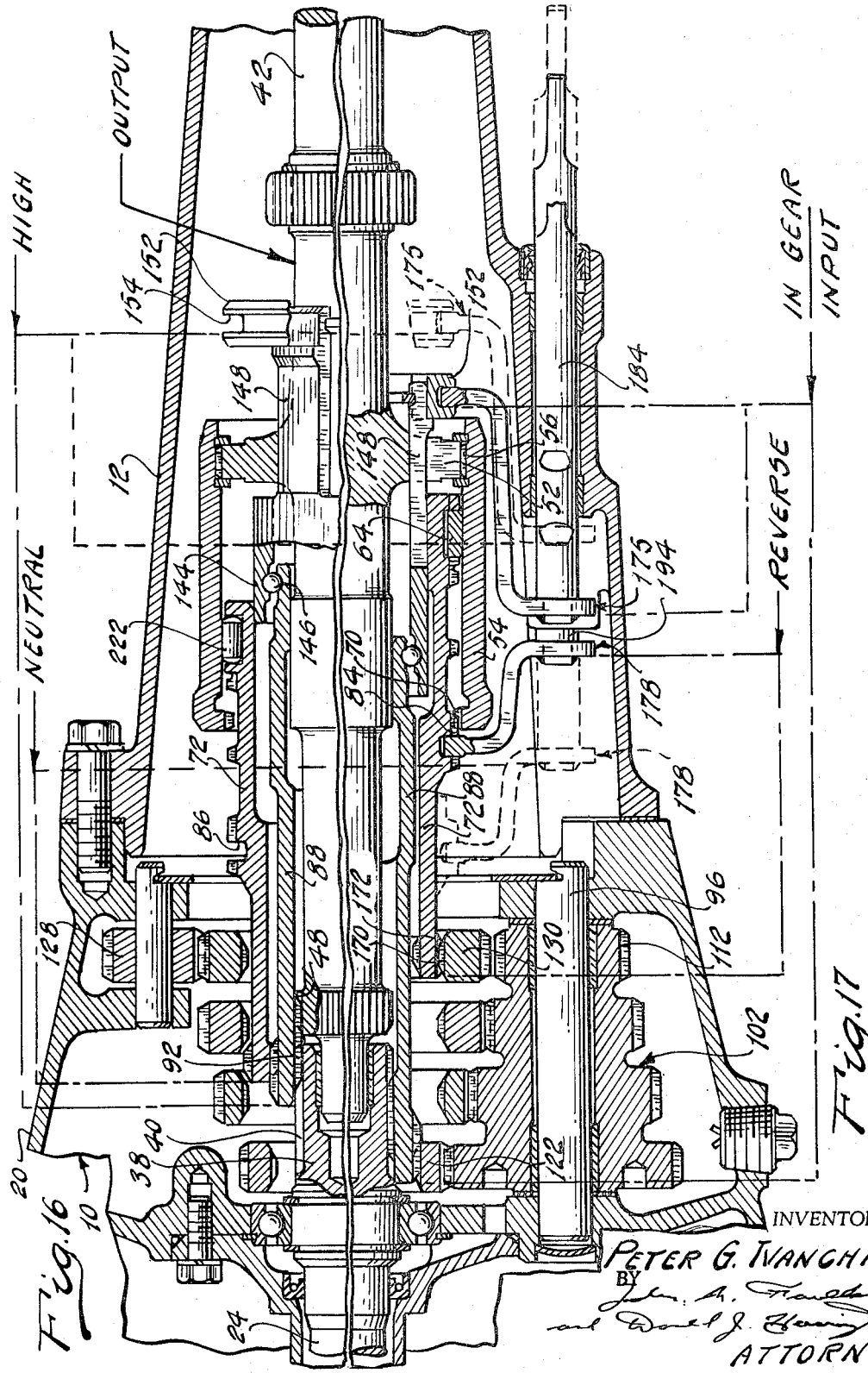

United States Patent Office 3,354,738
Patented Nov. 28, 1967

3,354,738
MULTIPLE SPEED RATIO POWER
TRANSMISSION MECHANISM
Peter G. Ivanchich, Dearborn, Mich., assignor to Ford
Motor Company, Dearborn, Mich., a corporation of
Delaware
Filed June 9, 1965, Ser. No. 462,567
10 Claims. (Cl. 74—330)

ABSTRACT OF THE DISCLOSURE

This specification describes a geared power transmission mechanism having three cluster gear assemblies disposed about the axis of a power output shaft. Power output gears engage the gear elements of the cluster gear assemblies and are rotatably supported by the plurality of gear meshes. The output gears are formed with clutch teeth which may be engaged selectively with clutch teeth formed on a clutch shaft, preferably in the form of a sleeve, which is drivably coupled to the driven member.

Gear teeth of the cluster gear assemblies and the power output gears are of the chevron or herringbone type whereby the axial thrust forces on the power output gears are substantially eliminated.

---

My invention relates generally to power transmission mechanisms having multiple speed ratios. It is adapted especially for use in the driveline of an automotive vehicle for delivering driving torque from the vehicle engine to the vehicle traction wheels.

More particularly my invention relates to multiple speed ratio power transmission mechanisms wherein driver controlled speed ratio changes from one ratio to another can be accomplished by means of a common synchronizer clutch assembly that is under the control of the vehicle operator.

The provision of a multiple speed ratio power transmission mechanism of the type described in the foregoing paragraphs being an object of my invention, it is another object of my invention to provide a gear system for an automotive vehicle driveline wherein at least one underdrive speed ratio and a direct drive speed ratio can be obtained, the underdrive torque delivery gear system being rendered inactive during operation in the direct drive high speed ratio.

It is a further object of my invention to provide a gear system for delivering torque from a driving member to a driven member comprising multiple torque delivery gears that are mounted for rotation about the axis of the driven member, each gear drivably engaging plural cluster gear assemblies, and means for synchronously clutching the gears to the driven member to initiate speed ratio changes.

It is a further object of my invention to provide a gear system of the type set forth in the foregoing object wherein the torque delivery gears are mounted for free floating movement by the plural cluster gear assemblies with no other supporting means being required.

It is a further object of my invention to provide a gear system of the type set forth of the foregoing objects wherein the torque delivery gears can be clutched to the driven member selectively by means of a sleeve shaft situated between the gears and the driven member, provision being made for axially adjusting the sleeve shaft to effect selective engagement of the torque delivery gears.

Further objects and features of my invention will become apparent from the following description and from the accompanying drawings, wherein:

FIGURES 1A and 1B show in longitudinal cross-section my improved transmission assembly. The plane of FIGURES 1A and 1B is along section line 1—1 of FIGURES 4 and 5;

FIGURE 2 is a cross-sectional view taken along the plane section line 2—2 of FIGURES 3 and 4;

FIGURE 3 is a partial cross-sectional view along section line 3—3 of FIGURE 2 showing a portion of the gearshift linkage mechanism for controlling speed ratio changes;

FIGURE 4 is a transverse cross-sectional view taken along the plane of section line 4—4 of FIGURE 1A;

FIGURE 5 is a transverse cross-sectional view taken along the plane of section line 5—5 of FIGURE 1A;

FIGURE 6 is a cross-sectional view taken along the plane of section line 6—6 of FIGURES 1A and 7;

FIGURE 7 is a longitudinal, partial cross-sectional view taken along section line 7—7 of FIGURE 6;

FIGURE 8 is a transverse cross-sectional view taken along section line 8—8 of FIGURES 1A, 2 and 3;

FIGURE 9 is a cross-sectional view taken along section line 9—9 of FIGURES 1A and 2;

FIGURE 10 is a transverse cross-sectional view taken along section line 10—10 of FIGURES 1A and 2;

FIGURE 11 is a transverse cross-sectional view taken along section line 11—11 of FIGURES 1A, 2 and 3;

FIGURE 12 is a longitudinal cross-sectional view taken along section line 12—12 of FIGURE 11;

FIGURE 13 is a diagrammatic representation of the gear shift pattern for the gearing system of my invention; and FIGURES 14, 15, 16 and 17 are views similar to FIGURE 1A showing the synchronizer clutch mechanism in various positions.

Figure 1A:
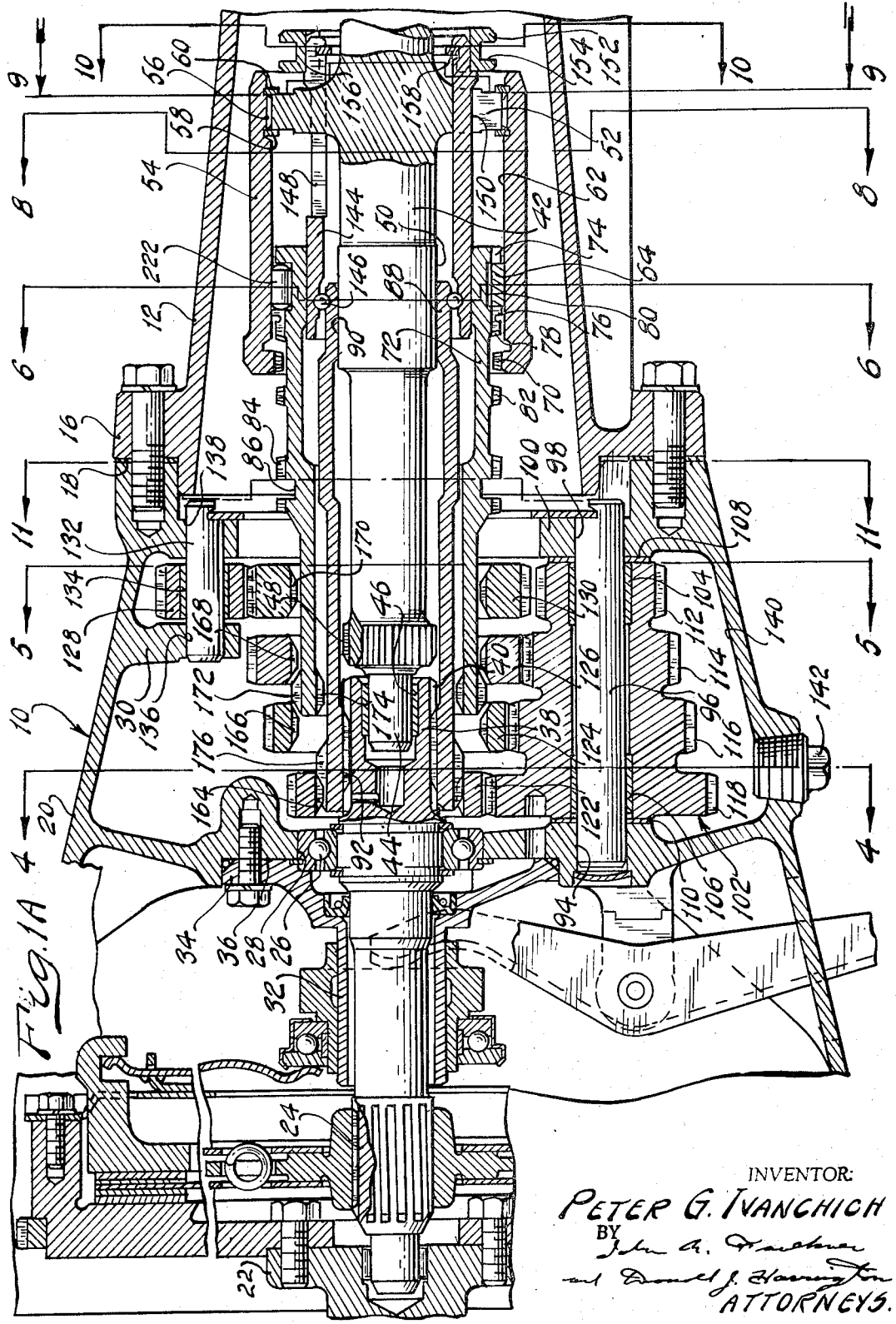

In the drawings numeral 10 designates generally the housing of a multiple speed ratio power transmission mechanism. It includes a main portion 12 which encloses torque transmitting clutch elements and a tailshaft extension housing portion 14 which may be formed integrally with portion 12 as indicated.

The left hand margin 16 of the housing portion 12 is formed with a flange that is bolted to an end surface 18 of a friction clutch and gear housing portion 20. The housing portion 20 in turn can be bolted at its outer margin to the engine block for an internal combustion vehicle engine in the usual fashion. The housing portion 20 may enclose a selectively engageable friction clutch that is under the control of the vehicle operator to establish and interrupt a driving connection between a power input shaft 24 for the torque transmitting gearing and the crankshaft 22 of the internal combustion engine.

Shaft 24 is journaled by means of a bearing 26 within a bearing opening 28 formed in a supporting wall structure. This supporting wall structure can form a part of a unitary housing assembly of which clutch housing portion 20 is a part. A clutch throw out bearing sleeve shaft 32 surrounds power input shaft 24. A flanged bearing retainer 34 is bolted to a forward surface 36 of the transverse supporting wall structure.

Shaft 24 extends within the housing portion 20 and defines a hollow sleeve extension 38 which is formed with external splined teeth 40. A power output shaft 42 is formed with a reduced diameter end 44 which is journaled by means of bushing 46 within the central opening of the sleeve extension 38.

External splined teeth 48 are formed on shaft 42. A bearing portion defining a cylindrical surface also is formed on shaft 42 as shown at 50.

An intermediate portion of the shaft 42 is provided with a radially extending flange 52 with external splined teeth formed on its outer periphery. These teeth mesh with internal splined teeth on a synchronizer sleeve 54 as shown at 56. Axial displacement of the sleeve 54 with respect to the shaft 42 is prevented by snap rings 58 and 60.

The sleeve 54 is formed with a cylindrical inner surface 62 which is engaged by the outer periphery of a split synchronizer ring 64. This ring is best seen by referring to FIGURES 6 and 7. When ring 64 is in a free state, the gap between the ends 66 and 68 is substantially greater than the corresponding gap that exists when the ring 64 is assembled in place within the cylindrical surface 62.

The left hand margin of the sleeve 54 is formed with internal synchronizer clutch teeth 70 disposed within the sleeve 54. In telescopic relationship therewith is a clutch sleeve 72 having formed at the right hand end thereof an annular shoulder 74. Synchronizer clutch teeth 76, which surround the sleeve 72, are formed with a pitch diameter that is equal substantially to the pitch diameter of teeth 70. The left hand ends of teeth 76 can be relieved as shown at 78. In a similar fashion, each axial end of the teeth 70 can be relieved. This permits clutching engagement of the teeth 76 with the teeth 70 as the sleeve 72 is shifted in a left hand direction in a manner that will be described subsequently.

The teeth 76 and the annular shoulder 74 cooperate to define an annular groove 80 within which the synchronizer ring 64 is situated. Axial shifting movement of the ring 64 with respect to the sleeve 72 therefore is substantially eliminated.

Synchronizer clutch teeth 82 also are formed about the periphery of sleeve 72. Similarly teeth 84 are formed about the periphery of sleeve 72 at a location spaced from the teeth 82. Both axial sides of the teeth 82 are relieved or chamfered as indicated to facilitate engagement with the teeth 70 in a manner subsequently to be described. The right hand ends of teeth 84 are also chamfered to permit clutching engagement with teeth 70 with a minimum degree of interference.

A groove 86 is formed at an intermediate location on sleeve 72. It is adapted to receive the ends of a shifter fork which will be described with reference to FIGURES 2 and 3.

Another clutch sleeve 88 surrounds shaft 42 in telescopic relationship with respect to sleeve 72. It is rotatably supported at the right hand end thereof by means of a bearing portion 90 formed on the shaft 42. The left hand end of the sleeve 88 is formed with internal splined teeth 92 which are in meshing engagement with splined teeth 40 formed on the extension 38 of the power input shaft 24. The splined teeth 40 and 92 form a sliding, positive, driving connection between shaft 24 and sleeve 88.

The transverse supporting wall is formed with an opening 94 which receives one end of the countershaft 96. Another opening 98 formed in a supporting web 100 receives the other end of the shaft 96. A cluster gear assembly 102 is rotatably journaled upon the countershaft 96 by means of spaced bearings 104 and 106. Thrust washers 108 and 110 are situated on either axial end of the clutch assembly 102.

Four cluster gear elements 112, 114, 116 and 118 are formed as part of the integral cluster gear assembly. There are three such cluster gear assemblies situated at 120 degree intervals about the axis of shafts 24 and 42. These are best seen by referring to FIGURES 4 and 5. These cluster gear assemblies have been identified by similar reference characters although they are distinguished by primed notations.

Cluster gear element 118 engages a power input gear 122. An intermediate speed ratio gear 124 engages cluster gear element 116 and a low speed ratio gear 126 engages cluster gear element 114. A reverse drive pinion 128, which is shown out of position in the cross-sectional view of FIGURE 1A, engages a reverse drive gear 130 and the cluster gear element 112. Pinion 128 is journaled upon pinion shaft 132 by means of bushing 134. There are three such pinions, one pinion corresponding to each cluster gear assembly 102.

Shaft 132 and each of the other two corresponding shafts are end supported as shown in FIGURE 1 at 30. One end of shaft 132 is received within an opening 136 formed in end wall 30 and the other end is received within an opening 138 formed in an axially offset portion of wall 30.

The gears 122, 124, 126 and 130 are positioned by the three cluster gear assemblies. The assemblies are spaced uniformly about the axis of shaft 32 and they prevent radial displacement of the gears 122, 124, 126 and 130. No bearing means for the gears is required.

Engaging teeth of the gear elements of the cluster gear assemblies and the gears 122, 124, 126 and 130, as well as the teeth of the reverse pinion 128, are of double-bevel, herringbone form. Axial thrust forces due to gear tooth loading are avoided.

The lower region of the housing portion 12 defines a sump 140 which stores the lubricating oil for the gearing. A drain plug on the sump is shown at 142.

Sleeve 88 is connected to an actuator ring 144 by means of thrust elements in the form of steel balls 146. These balls are situated within juxtaposed annular rings formed on the inner periphery of ring 144 and the outer periphery of sleeve 88. Axially extending extensions 148 formed on the ring 144 extend rearwardly in an axial direction through openings 150 formed in the flange portion 52 of the shaft 42. A grooved sleeve 152 is carried by the ends of extensions 148. They are formed with an annular groove 154 and with radial recesses 156 that receive the ends of the extensions 148. Sleeve 152 is held axially fast upon the ends of extensions 148 by a snap ring 158.

The extreme right hand end of the shaft 42 is journalled by means of a bearing 160 within a bearing opening 162 formed in a reduced diameter portion of the tail-shaft extension housing 14. This end of the shaft may be splined to facilitate a driving connection with a universal joint yoke in the usual fashion.

Each of the gears 122, 124, 126 and 130 is formed with a central opening within which is situated internal clutch teeth. The teeth are disposed about the periphery of the opening. They are identified respectively by reference characters 164, 166, 168 and 170. The left hand end of the sleeve 72 is formed with external clutch teeth 172 that are adapted to engage selectively clutch teeth 166, 168 and 170 as the sleeve 72 is shifted axially. That same end of sleeve 72 is formed also with internal clutch teeth 174 which are adapted to be engaged by external clutch teeth 176 formed on the left hand end of the sleeve 88 when the latter is shifted in a right hand direction.

In FIGURE 3 there is shown a pair of shifter forks identified generally by reference characters 175 and 178. Fork 175 includes an end 180 that may be received within annular groove 154 for the sleeve 152. Fork 178 includes an end 182 that may be received within groove 86 formed in sleeve 72.

Fork 175 is secured in a fixed fashion to one end of a shift rail 184. This rail is slidably disposed within an opening 186 formed in housing portion 12. It may be shifted axially by reason of the bearing action of spaced bushings 188 and 190 which are received within the opening 186. A shift linkage mechanism that may be under the control of the vehicle operator can be connected to the outwardly extending end 192 of the shift rail 184.

In a similar fashion shift fork 178 is secured in a fixed fashion to a shift rail 194 which is journaled within another opening 196 formed in the housing portion 12. Suitable bushings can be provided for supporting the rail 194 within the opening 196.

Like the rail 184, the extended end of rail 194 can be connected to a driver controlled shift linkage mechanism. The shifter forks 175 and 178 then can be positioned axially by the vehicle operator during speed ratio changes. When they assume the position shown in FIGURE 3, the sleeves 88 and 72 assume the positions as shown in FIGURE 1A. This is the so-called neutral position. The axial motion of the fork 175 is transmitted through the rotary connection provided by the balls 146 to the sleeve 88.

To prevent simultaneous shifting movement of both of the shift rails, there is provided, as shown in FIGURE 3, an interlock mechanism. This includes an interlock pin 198 that is slidably situated within a transverse opening 200 formed in the housing portion 12. The length of the pin 198 is slightly greater than the length of the opening 200, the latter intersecting the openings 186 and 196 for the shift rails.

Shift rail 184 is formed with a pair of detent recesses 202 and 204 within which is positioned a detent plunger 206. It is spring-biased into engagement with the recesses 202 or 204 by a spring 208. In a similar fashion shift rail 194 is provided with a pair of detent recesses 210 and 212 situated at axially spaced locations. A detent plunger 214 is adapted to be received within either one of the other recesses 210 or 212 under the influence of a biasing spring 216.

An interlock recess 218 is formed on the shift rail 184 and a corresponding interlock recess 220 is formed on the shift rail 194. When the shift rails assume a neutral position, recesses 218 and 220 are in alignment with opening 200. If rail 194 should be shifted, however, element 198 will be shifted into registry with recess 218 on the shift rail 184. Thus the shift rail 184 is prevented from shifting whenever the rail 194 is shifted. Conversely if the rail 184 is shifted from the position shown in FIGURE 4, element 198 will be moved into registry with recess 220 thereby locking the rail 194 against axial shifting movement.

The detent plungers 214 and 206 establish either of two operating positions for each of the shift rails 194 and 184, respectively. In FIGURE 13 there is shown the shift pattern that can be used to obtain the various speed ratio changes. The rail 194 can be moved to any one of four positions—namely, the intermediate position, low position, neutral position or reverse position. On the other hand the shift rail 184 can be moved between either of two positions—namely, the neutral position or the high position.

To establish low speed ratio forward drive operation the shift rail 194 is moved in a right hand direction, as shown in FIGURE 15, until teeth 172 on the sleeve 72 engage teeth 168 on the gear 126. The sleeve 88 assumes the position shown so that teeth 176 engage teeth 164 formed on gear 122. Thus engine torque is delivered from shaft 24, through the splines 40 and 92 and through the engaged teeth 176 and 164 to the gear 122. Torque then is transferred from gear 122 and through gear element 118, gear element 114, gear 126, sleeve 72, teeth 82, teeth 70, sleeve 54 and finally to the shaft 42. Prior to the time the sleeve 72 is shifted in the right hand direction, the gear 126 idles since it is engaged continuously by gear element 114. When teeth 172 engage teeth 168 upon movement of sleeve 72 in the right hand direction, the engagement can take place with no difficulty since there is no connection between the load and the sleeve 72 at that time. As soon as engagement occurs, however, sleeve 72 begins to rotate. This causes the synchronizer pin 222 shown in FIGURE 6 to engage the end 68 of the synchronizer ring 64. The sleeve 72 moves in a clockwise direction relative to sleeve 54 as seen in FIGURE 2 under these conditions. Thus as pin 222 engages end 68 of the ring 64 the latter will grip frictionally the sleeve 54. The greater the tendency for relative motion to take place between the sleeves 72 and 54, the greater will be the frictional gripping action between the ring 64 and the interior cylindrical surface of the sleeve 54. This frictional gripping action continues until the speed of the sleeve 64 and the speed of the sleeve 72 approach synchronism. When they rotate in substantial unison, the synchronization is complete and the teeth 82 may engage readily the teeth 70 without any clashing or harshness during the engagement.

To condition the mechanism for intermediate speed ratio operation it merely is necessary to shift the shift rail 194 in a left hand direction from the position shown in FIGURE 15 until teeth 166 engage teeth 172 as shown in FIGURE 14. Like the gear 126, the gear 124 idles since the cluster gear assembly 102 is rotating. No torque is transmitted through the cluster gear assembly, however, until the speed ratio change has been completed. Since the gear 124 is not subjected to torque, teeth 172 and teeth 166 can engage without difficulty. As soon as engagement is complete, however, sleeve 72 begins to rotate. Again synchronization begins to occur. Since the sleeve 72 and the sleeve 54 will be moving at different angular velocities, the synchronizer pin 222, which is situated between the ends 66 and 68 of the ring 64, again will engage the synchronizer ring 64 and cause it to grip the inner surface of the ring 64. This gripping action continues until the sleeve 54 rotates in unison with the sleeve 72. After the synchronization is complete, teeth 78 can be shifted into clutching engagement with the teeth 70. This completes a mechanical torque delivery path between the sleeve 72 and the power output shaft 42.

To condition the mechanism for high speed ratio operation the sleeve 88 is shifted in a right hand direction out of engagement with the gear 122 as shown in FIGURE 16. During forward drive operation in the underdrive ratios, sleeve 88 assumes a position that will allow teeth 176 to engage teeth 164. When the sleeve 88 is shifted by the shift rail 184, however, the teeth 176 move to a position intermediate teeth 164 and 174. Sleeve 72 assumes the position shown. Thus the teeth 176 engage teeth 174 before teeth 92 engage teeth 48. At the time of engagement of the teeth 176 and 174, however, there is no torque on the sleeve 72. Thus engagement of the gears occurs without difficulty. As soon as engagement is complete, relative motion again takes place between sleeves 54 and 72.

The synchronizer shown in FIGURES 6 and 7 then is effective again to establish synchronization between the shaft 42 and the shaft 24 before final shifting movement of the sleeve 88 takes place. When the final movement does occur, teeth 92 can be caused to engage teeth 48 without clashing and with a maximum degree of smoothness. After teeth 92 and teeth 48 engage, a direct mechanical connection exists between the shaft 24 and shaft 42. No torque is delivered through any of the gears 122, 124, 126 and 130, nor through any of the gear elements of the cluster gear assembly 102. In fact the cluster gear assembly and the torque delivery gears are disconnected from the gear train so that they are not required to rotate.

Reverse drive is accomplished by shifting the sleeve 88 back to the position shown in FIGURE 1 and by shifting the sleeve 72 in a right hand direction until teeth 170 engage teeth 172. This is shown in FIGURE 17. This occurs before torque is transmitted to sleeve 72. The synchronizer construction shown in FIGURES 6 and 7 again is effective to establish synchronism between sleeves 54 and 72 before teeth 84 are caused to engage teeth 70. After the synchronizer construction establishes synchronism, the shift rail 194 can be moved to its full reverse position. Torque then is delivered from shaft 24 and through the splined teeth 40 and 92, the teeth 176 and 164, gear 122, the cluster gear assembly 102, the reverse drive pinions 128, the gears 130, the sleeve 72 and engaged teeth 84 and 70, finally through sleeve 54 to the power output shaft 42.

It may be possible that the roller 222 can be replaced by a radial shoulder formed on the sleeve 72 or by a radial pin which may be situated between the ends 66 and 68. Like the roller 222, such a shoulder or pin would engage the end of a ring 64 to establish the selfenergized frictional action during the synchronization of the sleeves 54 and 72.

Having thus described a preferred form of my invention, what I claim and desire to secure by U.S. Letters Patent is:

1. In a power transmission mechanism for delivering torque from a driving member to a driven member, a synchronizer clutch mechanism comprising concentric clutch members, one clutch member being connected to said driven member and rotatable therewith, first clutch teeth carried by said one clutch member, means for establishing and disestablishing selectively a torque delivery path between said driving member and the other synchronizer clutch member, said other synchronizer clutch member having formed thereon second clutch teeth that are adapted to engage the teeth of said one member as one of said synchronizer clutch members is shifted axially with respect to the other, a synchronizer clutch ring within the outermost one of said clutch members and frictionally engaging the inner periphery of the same, said clutch ring being split to provide two juxtaposed ends, and a thrust means for transferring torque from said other synchronizer clutch member to one of said ring ends thereby establishing the clutching action between said ring and the inner periphery of said one clutch member as relative motion takes place between said synchronizer clutch members, the frictional action of said ring establishing synchronism between said clutch members prior to relative shifting motion of said first and second clutch teeth into engagement.

2. In a power transmission mechanism for delivering torque from a driving member to a driven member, a synchronizer clutch mechanism comprising concentric clutch members, the outermost clutch member being connected to said driven member and rotatable therewith, internal clutch teeth carried by said outermost clutch member, means for establishing and disestablishing selectively a torque delivery path between said driving member and the other synchronizer clutch member, said other synchronizer clutch member having formed thereon external clutch teeth that are adapted to engage the teeth of said outermost clutch member as one of said synchronizer clutch members is shifted axially with respect to the other, a synchronizer clutch ring within said outermost clutch member and frictionally engaging the inner periphery of the same, said clutch ring being split to provide two juxtaposed ends, a thrust means for transferring torque from said synchronizer clutch member to one of said ring ends thereby establishing a clutching action between said ring and the inner periphery of said one member as relative motion takes place between said synchronizer clutch members, the frictional action of said ring establishing synchronism between said members prior to shifting motion of said external clutch teeth into engagement with said internal clutch teeth, and multiple speed ratio gear means for connecting drivably said driving member to said second synchronizer clutch member thereby establishing plural torque delivery paths between said other clutch member and said power input shaft, each path being characterized by a different speed ratio.

3. A power transmission mechanism for delivering power from a driving member to a driven member comprising a plurality of torque delivery gears disposed coaxially with respect to said driven member, a plurality of cluster gear assemblies mounted in a fixed portion of said mechanism for rotation about parallel fixed axes, said cluster gear assemblies comprising gear elements that respectively engage said torque delivery gears thereby supporting the latter for rotation about the axis of said driven member, a synchronizer clutch means for connecting selectively said torque delivery gears to said driven member, and a selectively engageable clutch means for connecting selectively one of said torque delivery gears to said driving member to establish a power input torque delivery path to each of said cluster gear assemblies.

4. A power transmission mechanism for delivering power from a driving member to a driven member comprising a plurality of torque delivery gears disposed coaxially with respect to said driven member, a plurality of cluster gear assemblies mounted in a fixed portion of said mechanism for rotation about parallel fixed axes, said cluster gear assemblies comprising gear elements that respectively engage said torque delivery gears thereby supporting the latter for rotation about the axis of said driven member, a synchronizer clutch means for connecting selectively said torque delivery gears to said driven member, a second selectively engageable clutch means for connecting selectively one of said torque delivery gears to said driving member to establish a power input torque delivery path to each of said cluster gear assemblies, and personally operable means for disconnecting said selectively engageable clutch means and said synchronizer clutch means during direct drive operation and for establishing a positive driving connection between said driving member and said driven member whereby a direct torque delivery path is established therebetween with no torque being delivered through said gears.

5. A power transmission mechanism comprising a driving member and a driven member, a plurality of torque delivery gears coaxially disposed with respect to said driven member, a plurality of cluster gear assemblies mounted for rotation about fixed axes that are parallel to the axis of the driven member, the cluster gear assemblies comprising multiple gear elements that respectively engage each of said torque delivery gears, a first clutch sleeve surrounding said driven member, a second clutch sleeve in coaxial relationship with respect to said first clutch sleeve and connected to said driven member, means for transferring axial motion of one sleeve to the other, internal clutch teeth carried by each of said torque delivery gears, internal and external clutch teeth carried by said first sleeve, clutch teeth carried by said driving member, the teeth of said first sleeve establishing a driving connection between the teeth of one of said torque delivery gears and the teeth of said driving member when it assumes one axial position, clutch teeth carried by said driven member, the teeth of said first sleeve establishing a direct driving connection between the teeth of said driven member and the teeth of said driving member when it assumes a second axial position, said one torque delivery gear being disengaged by said first sleeve when the latter assumes said second position, the external teeth of said first sleeve being selectively engageable with the teeth of the other torque delivery gears as the second sleeve is shifted axially, and means for synchronizing the motion of gears with respect to said first sleeve upon shifting movement of said second sleeve during speed ratio changes.

6. In a power transmission mechanism, a driving member, a driven member, multiple torque delivery gears coaxially disposed with respect to said driving and driven members, cluster gear assemblies mounted for rotation about axes parallel to the axis of said gears and engageable with said gears, means for connecting drivably said driving member and said cluster gear assemblies, and common synchronizer clutch means for connecting selectively each of said gears to said driven member.

7. The combination as set forth in claim 6 wherein said means for connecting said driving member and said cluster gear assemblies comprises a power input gear engageable with said cluster gear assemblies, internal teeth in said power input gear, a clutch sleeve coaxial with said driving member with a sliding spline connection therebetween, and external clutch teeth on said sleeve engageable with said internal teeth when said sleeve assumes one axial position.

8. In a power transmission mechanism, a driving member, a driven member, torque delivery gears coaxially disposed with respect to said driving and driven members, three cluster gear assemblies mounted for rotation about axes parallel to the axis of said gears, said gear elements and said gears having gear teeth with double lead angles whereby axial thrust forces due to gear tooth loading are substantially eliminated, means for connecting drivably said driving member and said cluster gear assemblies, said gears being supported by said cluster gear assemblies for floating movement, means for connecting selectively said gears to said driven member, said means for connecting said driving member and said cluster gear assemblies comprising a power input gear engageable with said cluster gear assemblies, internal teeth in said power input gear, a clutch sleeve coaxial with said driving member with a sliding spline connection therebetween, and external clutch teeth on said sleeve engageable with said internal teeth when said sleeve assumes one axial position.

9. The combination as set forth in claim 8 wherein said driven member includes spline teeth, said sliding spline connection including spline teeth on said clutch sleeve, the spline teeth on said sleeve and the spline teeth on said driven member being engaged to establish a direct-drive connection between said driving and driven members when said sleeve assumes another axial position.

10. The combination as set forth in claim 7 wherein said driven member includes spline teeth, said sliding spline connection including spline teeth on said clutch sleeve, the spline teeth of said sleeve and the spline teeth on said driven member being engaged to establish a direct drive connection between said driving and driven members when said sleeve assumes another axial position.

References Cited

UNITED STATES PATENTS

| | | | |
|---|---|---|---|
| 2,416,154 | 2/1947 | Chilton | 74—331 |
| 3,020,991 | 2/1962 | Altmann | 74—339 |
| 3,283,613 | 11/1966 | Perkins | 73—331 |

DONLEY J. STOCKING, *Primary Examiner.*

ROBERT M. WALKER, *Examiner.*

H. S. LAYTON, *Assistant Examiner.*